United States Patent [19]

Berkshire et al.

[11] 4,357,248
[45] Nov. 2, 1982

[54] TREATING WELLS WITH SELF-PRECIPITATING SCALE INHIBITOR

[75] Inventors: David C. Berkshire; Jimmie B. Lawson; Edwin A. Richardson, all of Houston, Tex.

[73] Assignee: Shell Oil Company, Houston, Tex.

[21] Appl. No.: 256,177

[22] Filed: Apr. 21, 1981

Related U.S. Application Data

[63] Continuation-in-part of Ser. No. 150,382, May 16, 1980, abandoned.

[51] Int. Cl.$^3$ .......................... C02F 5/14; E21B 43/25
[52] U.S. Cl. .................................. 252/8.55 B; 166/279
[58] Field of Search ............... 252/8.55 B, 8.55 R, 252/8.55 C, 8.55 D; 166/279, 244 C

[56] References Cited

U.S. PATENT DOCUMENTS

| | | | |
|---|---|---|---|
| 3,483,925 | 12/1969 | Slyker | 252/8.55 X |
| 3,633,672 | 1/1972 | Smith et al. | 252/8.55 X |
| 3,704,750 | 12/1972 | Miles et al. | 252/8.55 X |
| 3,943,059 | 3/1976 | Chiu | 252/8.55 |
| 3,953,340 | 4/1976 | Templeton et al. | 252/8.55 |
| 3,997,452 | 12/1976 | Richardson et al. | 252/8.55 |

*Primary Examiner*—Herbert B. Guynn

[57] ABSTRACT

The scaling of a producing well is inhibited by injecting a self-reacting alkaline aqueous solution of a pH-lowering reactant, a compound containing scale-inhibiting anions and a compound containing multivalent cations, which solution subsequently precipitates a slightly soluble scale inhibitor within the reservoir.

4 Claims, 5 Drawing Figures

TREATING WELLS WITH SELF-PRECIPITATING SCALE INHIBITOR

CROSS-REFERENCE TO RELATED APPLICATION

This application is a continuation-in-part of application Ser. No. 150,382 filed May 16, 1980 now abandoned. The disclosure of that application is incorporated herein by cross-reference.

BACKGROUND OF THE INVENTION

Relatively low concentrations of water-soluble, organic scale inhibitors are known to reduce the rate of scale formation in and around the bottom of a producing well. Scales are slightly soluble inorganic salts, such as calcium or barium sulfates or calcium carbonate, etc. The mechanism of the inhibition is probably a combination of sequestering or complexing of multivalent cations and an absorption of inhibitor onto solid surfaces such as the rapid growth planes of newly formed crystalites. Although a wide variety of materials inhibit crystal growth, the compounds most commonly used in well treatments are organic phosphates or phosphonates or adducts of acrylic acid or the like. Where supersaturated, or scale forming, waters are encountered in an oil production operations, scale inhibitors are commonly injected or "squeezed" into the reservoir formation. The squeezing amounts to injecting the inhibitor and, usually, overflushing the treated zone with water. The well is placed back on production and the entrainment of the inhibitor in the produced water protects the wellbore and downhole equipment from scale build-up.

The squeezing is a convenient way to apply an inhibitor since there is no injection equipment to install or maintain. It is known to be generally desirable that a scale inhibitor be produced in low concentrations within the produced water, such as from about 25 to 100 parts per million. But, this goal is almost never achieved. Generally, most of the injected inhibitor is quickly produced. Various attempts to delay the rate of its production, such as causing it to be adsorbed on the rock surfaces, are only partially successful. And, this has also been true of prior attempts to induce the precipitation within the reservoir of slightly soluble multivalent cation salts of the inhibitor.

For example, U.S. Pat. No. 3,483,925 mentions the problems of obtaining a gradual and uniform return of a squeezed-in inhibitor and proposes the injection of alternating slugs of inhibitor solution and a polymer-thickened solution. U.S. Pat. No. 3,633,672 proposes injecting an inhibitor which forms multivalent cation salts which are only slightly soluble in substantially neutral or alkaline water with both the inhibitor and a compound containing multivalent cations dissolved in an acidic aqueous liquid, so that the relatively insoluble salt of the inhibitor is precipitated when the acid is neutralized within the reservoir. U.S. Pat. No. 3,704,750 suggests injecting a strongly acidic solution of a monovalent cation salt of polyacrylic acid or amide and a salt of a multivalent cation, to cause a similar precipitation of an inhibitor of low solubility when the acid is neutralized within the reservoir. U.S. Pat. No. 3,782,469 proposes that an inhibitor be adsorbed on fracture-propping grains which are then emplaced within a fracture in the reservoir in order to provide a reliably coated source of surfaces from which the inhibitor is desorbed.

SUMMARY OF THE INVENTION

The present invention relates to a process for treating a subterranean reservoir by injecting into it a self-reactive solution which subsequently precipitates a scale inhibitor of relatively low water solubility. An anionic scale inhibitor and a multivalent cation salt are dissolved in an alkaline aqueous liquid to provide a solution which contains both scale-inhibiting anions and multivalent cations which are mutually soluble at the alkaline pH, but which, at a lower pH and the temperature of the reservoir are precipitated as a scale inhibiting compound having an effective but relatively low water-solubility. At least one compound which reacts at a relatively slow rate to reduce the pH of an alkaline aqueous solution is also dissolved in the solution. The rate at which the pH of the solution is reduced is adjusted, by arranging the composition and/or concentration of the compounds dissolved in the solution, and/or by adding a compound capable of altering the rate of the pH-reducing reaction, to correlate the rate of the pH-reduction with the temperature and injectivity properties of the well and reservoir. The rate of the pH-reduction is arranged so that (a) a selected volume of the inhibitor-containing solution can be injected into the reservoir before the occurrence of any significant amount of precipitation and (b) a significant amount of precipitation will occur within a few hours after the injection. The solution is then injected into the reservoir before a significant amount of precipitation has occurred and the rate of its injection is controlled so that a significant amount of the scale inhibiting compound is precipitated near the borehole of the well.

DESCRIPTION OF THE INVENTION

The present invention is, at least in part, premised on a discovery that by dissolving (a) a multivalent cation salt of a compound containing a scale inhibitive anion (or dissolving a combination of salts which provide a solution containing such a combination of ions) in an alkaline aqueous solution which has a pH exceeding one at which the multivalent cation salt of the scale-inhibiting anions becomes substantially insoluble and (b) also dissolving in the solution a compound which reacts relatively slowly and generates hydrogen ions that reduce the pH of the solution, a scale inhibitor can be injected into and deposited within a subterranean reservoir so that it will subsequently become relatively slowly and uniformly dissolved within an aqueous liquid which is produced from the treated portion of the reservoir.

The present inhibition-containing solution is self-reacting and thus precipitates the inhibitor in a substantially uniform manner throughout any portion of the reservoir which is permeated by the solution. Such a self-reactive solution works well in either homogeneous or heterogeneous siliceous reservoirs that may be substantially free of acid-neutralizing components, and also works well in such carbonaceous reservoirs that may contain vast excesses of acid-neutralizing components. In addition, the present solution is also a single phase liquid and can be arranged to have a viscosity and/or a dissolved salt content substantially matching those of the waters which will be contacted within and/or produced through the treated zone of the reservoir. Further, the rate at which the pH is reduced within the present solution can be correlated with the injectivity properties and temperature of substantially any well and reservoir in order to be sure that the precipitation will occur after, but only shortly after, the solution has been transported into the reservoir.

In the present process the scale inhibitor to be used should be one which (a) is capable of preventing scaling by the fluid produced from the reservoir at the reservoir temperature when dissolved in the aqueous phase of that fluid in an effective but relatively low concentration of, for example, at least about 25 but not significantly more than about 100 parts per million and (b) forms multivalent cation salts having water-solubilities which are significantly less at a pH below about 10 than at a pH of from about 10 to 14.

In the present process the pH at which the inhibitor-containing solution is flowed into the well and the rate at which its pH is reduced should be correlated relative to the injectivity and temperature properties of the well and the reservoir. Such factors should be correlated at least to the extent required to avoid any significant amount of premature precipitation (before the solution has entered the reservoir) or an unduly delayed precipitation (requiring a long wait after the solution has entered the reservoir).

The initial alkalinity of the inhibitor-containing solution can be provided by one or a combination of alkaline compounds or materials. Substantially any water-soluble alkaline compounds which are compatible with the other components of the solution and the scale inhibitor-precipitation reaction can be used. The alkali metal hydroxides and/or the alkaline alkali metal salts of the anions of the scale inhibitor being used are particularly suitable as such alkaline materials.

The means by which a premature precipitation is avoided may include (a) using a pH-reducing compound which reacts very slowly at the surface temperature but reacts relatively rapidly at the reservoir temperature (b) adding the pH-reducing reactant to the inhibitor-containing solution just before that solution is flowed into the well (c) using a relatively rapid injection rate while the inhibitor solution is being transported to the reservoir followed by a slow or intermittent terminated flow after that solution has entered the reservoir, (d) dissolving within the inhibitor-containing solution a buffering system which maintains the initial relatively high pH while the solution is being transported to the reservoir but is then overridden to allow a rapid pH reduction after the solution enters the reservoir, etc.

The means by which a prompt precipitation of a significant amount of the inhibitor can be induced after the inhibitor-containing solution reaches the reservoir may include (a) buffering the pH of the solution being injected at a value only slightly above one at which the precipitation occurs (b) using a relatively high concentration of pH-lowering reactant which is relatively unreactive at the reservoir temperature (c) injecting a relatively large volume of relatively dilute inhibitor-containing solution so that a significant deposit of precipitate is built up, layer-by-layer, during the flowing of that volume of the solution through the zone around the well, etc.

In general, the multivalent cation salts of anionic scale inhibitors—those which contain scale-inhibiting anions, such as the organophosphorous-type scale inhibitors—have water solubilities which increase with increasing alkalinity. Such an increased solubility may be due to, for example, an increase in the complexing ability of the inhibitor as the pH is raised. Also, an increase in the pH may suppress the concentration of the particular inhibitor anions which can combine with the multivalent cation to form a precipitate, in a manner which results in a lowering of the ion product of the insoluble salt. Substantially any such inhibitors which are compatible with the other components of the present type of inhibitor solution can be used in the present process. Substantially any such anionic scale inhibitor can be used in the present process. Those which are preferred for use in the present process are members of the group consisting of phosphate and phosphonate scale inhibitors. And, particularly preferred inhibitors for use in the present invention comprise nitrogen-containing phosphonate scale-inhibiting compounds such as the nitrilotri(methylene phosphonic acid) or diethylenetriaminepenta (methylene phosphonic acid) which are available from Monsanto Chemical Company under the trade names Dequest 2000 and Dequest 2060. Other suitable inhibitors include Dequest 2010, 2041 and 2051 inhibitors. Tests of calcium salts of Dequest 2060 as precipitated from the present self-precipitating scale inhibition solutions have shown that they prevent precipitation of $CaSO_4$ and $CaCO_3$ minerals from waters supersaturated with such minerals.

Numerous compounds are known to react within an aqueous solution at a relatively slow rate while yielding hydrogen ions and reducing the pH of the solution. In the present process, substantially any such pH-reducing reactant can be used as long as an effective amount of it is soluble in an aqueous alkaline solution containing effective amounts of multivalent cation salts and anionic scale inhibitors and as long as it reacts to yield only hydrogen ions and byproducts which are compatible with the functioning of the other components of the solution. The esters or amides of water-soluble acids which hydrolyze at moderate rates at reservoir temperatures (in the absence of special catalysts, sensitizers, or the like) comprise generally suitable pH-reducing reactants. Examples of suitable reactants include: amides of water soluble carboxylic acids such as formamide, dimethyl formamide, 2-chloroacetamide; amides of sulfonic acids, such as methanesulfonamide; inorganic acid amides, such as sulfamide; esters of water-soluble alcohols and acids such as methyl formate, methyl acetate, methylgallate; the acetates of alcohols, glycols or other hydroxy compounds which are normally liquid and water-soluble; hydrolyzable organic halides such as normal-propylchloride, iso-propylchloride, tertiary-butylchloride, allylchloride and the like. The water-soluble alcohol esters of water-soluble aliphatic carboxylytic acids having dissociation constants of from about $10^{-2}$ (oxalic acid) to $10^{-6}$ (butyric acid) are preferred. The composition (and thus the reactivity) of each pH-reducing reactant which is included within the inhibitor-containing solution should be correlated with the reservoir temperature to provide a suitable rate of reaction at that temperature. Halogen-containing reactants should not be used in situations in which significant proportions of halogenated materials might become dissolved or entrained in produced crude oil which will be sent to a refinery.

Multivalent cation salts which are suitable for use in the present invention can comprise substantially any which are soluble in the aqueous alkaline inhibitor solution containing the pH-reducing reactant and are substantially inert with respect to those materials (except for their capability of forming a precipitated scale-inhibiting compound of relatively low water-solubility at a lower pH). In general, suitable compounds include the water-soluble salts of non-oxidizing acids and alkaline earth metals or metals such as aluminum, chromium, iron or the like. Calcium chloride is particularly suitable as the multivalent cation salt to be used in the present process.

In general, a buffering system suitable for use in the present invention is one which is both compatible with the inhibitor solution components and capable of maintaining a relatively high pH (at which the inhibitor is soluble) until the inhibitor solution has been transported from a surface location to the reservoir. The buffer should be present in a proportion relative to that of the pH-reducing reactant which, after the solution enters the reservoir, allows the pH of the solution to be relatively rapidly reduced (to one at which the inhibitor is precipitated) by the hydrogen ions produced by the pH-reducing reactant. For example, with respect to the particularly suitable Dequest 2060 inhibitor, a substantially ideal buffer would have a pka of about 7.5 to 8.5, which would permit a relatively long delay time and would require only a relatively low concentration of buffer and pH-reducing reactant (such as methyl formate). However, sodium bicarbonate (pka about 6.4) and glycine (pka about 9.5) have been found to be generally suitable in view of their compatibility, operability and relatively low cost and high availability. A buffer having a desirable pka may fail to be compatible with the inhibitor-solution components. For example, 1,3-diaminopropane (pka about 8.5) tends to produce a cloudy solution at an initial solution pH as low as about 0.

In the present inhibitor solution, methyl formate undergoes a relatively rapid hydrolysis at a reservoir temperature in the order of 100° F. (yielding one mole each of methyl alcohol and formic acid for each mole of the ester). In a solution containing the calcium salt of the Dequest 2060 inhibitor, at an initial pH of about 8, the rate of decomposition of methyl formate is dependent principally on temperature. Table I shows the precipitation times for various solutions that each contain 0.05 moles per liter of the Dequest inhibitor and 0.17 moles per liter of calcium ions at a reaction temperature of 100° F. That temperature is typical of various wells needing such a scale inhibitor treatment and, in those wells, a time of initiation of the precipitation of about 2 hours is generally adequate for pumping the solution into the formation. In those wells, the solution No. 7 is a particularly suitable formulation.

TABLE I

Characteristics of the Calcium-Dequest 2060-Glycine-Methyl Formate System

| Solution Numbers | MeFor (mol/L) | Minutes to ppt | pH at start of ppt | Total minutes of run | pH at end of run | Total ppt at end of run, g/L | % Dequest precipitated |
|---|---|---|---|---|---|---|---|
| 1 | 0.20 | 35 | 7.2 | 1020 | 5.8 | 29.1 | 100 |
| 2 | 0.25 | 40 | 7.2 | 1200 | 5.7 | 29.6 | 100 |
| 3 | 0.30 | 30 | 7.2 | 3800 | 4.9 | 24.6 | 86 |
| 4 | 0.36 | 20 | 7.2 | 1040 | 5.3 | 24.7 | 86 |
| 5 | 0.33 | No ppt | pH stead at 7.8 after 100 minutes | | | | |
| 6 | 0.37 | 300 | 6.5 | 1200 | 6.1 | 19.4 | 68 |
| 7 | 0.47 | 120 | 6.5 | 960 | 5.8 | 23.4 | 82 |

In general, as indicated above, a particularly suitable buffer would be one having a pka of from about 7.5 to 8.5 that would permit relatively long delay times at much lower concentrations of the buffer and methyl formate than those needed for glycine which has a pka of about 9.5. Sodium bicarbonate and glycine are generally preferred buffers because they are effective and appear to provide no interfering side reactions. Examples of other suitable buffer compounds or systems include potassium or lithium bicarbonate, triethanol amine, etc.

In a well treating operation involving an injection of an aqueous liquid, it is generally preferable to use the brine present within the reservoir or an aqueous solution substantially equivalent to that brine in kinds and amounts of multivalent and monovalent ions. The salt contents of various typical oilfield brines from wells in which scaling problems occur and which wells could advantageously be treated by an inhibitor squeeze operation are listed in Table II.

The solubilities of the calcium salt of Dequest 2060 inhibitor in the same brines are listed in Table III. For such salts to inhibit scaling, they must be soluble enough to maintain at least a low level of the inhibitor in the solution and, as indicated in Table III such solubilities were exhibited by each of the tested brines.

TABLE II

Analyses of Brines Produced from Wells in Texas

| | Well No. 1 | | | Well No. 2 | | | Well No. 3 | |
|---|---|---|---|---|---|---|---|---|
| Ion | mg/Liter | mol/Liter | Ion | mg/Liter | mol/Liter | Ion | mg/Liter | mol/Liter |
| Cl | 49,500 | 1.394 | Cl | 86,000 | 2,423 | Cl | 105,500 | 2,972 |
| Ca | 3,360 | 0.084 | Ca | 6,120 | 0.153 | Ca | 13,040 | 0.326 |
| Mg | 753 | 0.031 | Mg | 1,288 | 0.053 | Mg | 1,774 | 0.073 |
| $HCO_3$ | 610 | 0.010 | $HCO_3$ | 610 | 0.010 | $HCO_3$ | 366 | 0.006 |
| $SO_4$ | 3,350 | 0.035 | $SO_4$ | 5,150 | 0.054 | $SO_4$ | 1,800 | 0.019 |
| Na | 28,589 | 1,243 | Na | 48,898 | 2,126 | Na | 50,968 | 2,216 |

TABLE III

Solubilities of Calcium Dequest Salts in Representative Field Brines @ 100° F.

| Brine | Cation | Inhibitor | pH | Solubility, PPM |
|---|---|---|---|---|
| Well 1 | Calcium | Dequest 2060 | 5.97 | 540 |
| " | " | " | 6.55 | 529 |
| " | " | " | 7.05 | 518 |
| " | " | " | 7.50 | 518 |
| Well 2 | " | " | 5.97 | 488 |
| " | " | " | 6.50 | 540 |
| " | " | " | 6.98 | 492 |
| " | " | " | 7.55 | 400 |
| Well 3 | " | " | 5.97 | 437 |
| " | " | " | 6.50 | 448 |
| " | " | " | 7.03 | 422 |
| " | " | " | 7.55 | 400 |

It should be noted that in Table II the concentrations of both calcium and magnesium ions increased in the tested brines, in the order of Well Nos. 1, 2, 3. Because of this, the common ion effect would be expected to decrease the solubility of the salts in the same order and this is indicated in the data in Table III.

But, note that a different result is indicated by the data in Table IV. Since the downhole pH of a brine is usually an unknown quantity (since only cooled and de-gassed samples are usually subjected to pH measurements) a series of samples of the same brines were adjusted to pH's 6.0, 6.5, 7.0 and 7.5. In separate tests, calcium and magnesium salts of each of the inhibitors Dequest 2000 and 2060 were added to such samples and stirred intermittently at 100° F. for 7 to 13 days after which the precipitates were filtered-out on 0.45 micron acetate filters and the filtrates were analyzed for phosphorous, in order to determine the concentrations of the inhibitor. These tests indicated a reversal of the solubility orders between the calcium and magnesium salts. Although the common ion effect (due to the increasing concentrations of calcium and magnesium in the brines 1, 2, 3) decreased the solubility of the salts in the same order regarding Dequest 2060, this was not true regarding Dequest 2000. Such complications may be due to the fact that any anionic inhibitor which goes into solution from a salt will be complexing with its non-common ion (e.g. some of the inhibitor from a calcium salt will complex with the magnesium in solution). This makes for a very complicated interaction in which simple predictions are not necessarily realized in fact. In addition, since the indicated pH's were measured at room temperature, the values were probably shifted at 100° F. Further, the solution of the weak acid inhibitor anions would also shift the pH's as they neared equilibrium.

TABLE IV

Solubilities of Calcium and Magnesium Dequest Salts in Representative Field Brines @ 100° F.

| Brine | Cation | Inhibitor | Set pH | (PPM) | Brine | Cation | Inhibitor | Set pH | (PPM) |
|---|---|---|---|---|---|---|---|---|---|
| 1 | Calcium | Dequest 2060 | 5.97 | 540 | 1 | Calcium | Dequest 2000 | 6.05 | 302 |
|   |   |   | 6.55 | 529 |   |   |   | 6.50 | 437 |
|   |   |   | 7.05 | 5.8 |   |   |   | 7.03 | 437 |
|   |   |   | 7.50 | 518 |   |   |   | 7.50 | 391 |
| 2 | Calcium | Dequest 2060 | 5.97 | 488 | 2 | Calcium | Dequest 2000 | 5.90 | 374 |
|   |   |   | 6.50 | 540 |   |   |   | 6.50 | 410 |
|   |   |   | 6.98 | 492 |   |   |   | 7.00 | 368 |
|   |   |   | 7.55 | 400 |   |   |   | 7.54 | 368 |
| 3 | Calcium | Dequest 2060 | 5.97 | 437 | 3 | Calcium | Dequest 2000 | 6.02 | 387 |
|   |   |   | 6.50 | 448 |   |   |   | 7.00 | 407 |
|   |   |   | 7.03 | 422 |   |   |   | 7.00 | 407 |
|   |   |   | 7.55 | 400 |   |   |   | 7.48 | 420 |
| 1 | Magnesium | Dequest 2060 | 6.00 | 370 | 1 | Magnesium | Dequest 2060 | 6.03 | 460 |
|   |   |   | 6.50 | 374 |   |   |   | 6.50 | 3.74 |
|   |   |   | 7.02 | 370 |   |   |   | 6.95 | 427 |
|   |   |   | 7.48 | 366 |   |   |   | 7.48 | 335 |
| 2 | Magnesium | Dequest 2060 | 6.03 | 407 | 2 | Magnesium | Dequest 2060 | 6.00 | 387 |
|   |   |   | 6.50 | 381 |   |   |   | 6.52 | 345 |
|   |   |   | 7.00 | 392 |   |   |   | 7.02 | 345 |
|   |   |   | 7.50 | 377 |   |   |   | 7.50 | 322 |
| 3 | Magnesium | Dequest 2060 | 6.00 | 366 | 3 | Magnesium | Dequest 2060 | 6.02 | 361 |
|   |   |   | 6.50 | 374 |   |   |   | 6.50 | 348 |
|   |   |   | 7.03 | 366 |   |   |   | 7.00 | 328 |
|   |   |   | 7.52 | 370 |   |   |   | 7.52 | 348 |

In a particularly preferred procedure, determinations are made to ensure the proper correlations between the inhibitor solution composition and the injectivity temperature and electrolyte properties of the well and reservoir. Such determinations preferably include tests at least equivalent to, for example, emplacing the inhibitor salt in a core representative of the reservoir formation and then flowing brine representative of the reservoir brine through the core at a rate and temperature representative of those involved in the production operation. In this manner, the desired effect of pH can be relatively accurately evaluated by adjusting the pH and/or pH-lowering rate of the inhibitor solution and analyzing the output. By using cores and brines from or like the reservoir materials, such a procedure can indicate any effects that might result from the interaction of the reservoir fluid or rock on the solubility of the inhibitor salts.

Figure 1:
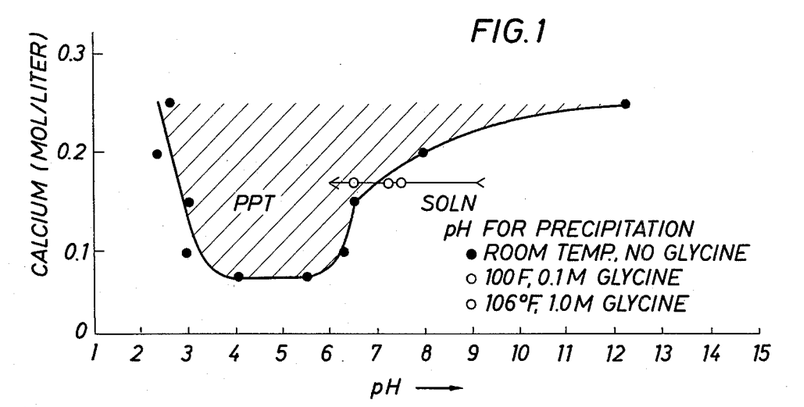
FIG. 1 shows a plot of the regions of calcium concentrations and pH's which cause a calcium salt of a particular scale inhibitor to be precipitated from various solutions at various temperatures.

The pH-solubility relationship for a particular cation-inhibitor combination depends on the mole ratio of cations to the inhibitor-anions. With respect to calcium salts in a solution containing 0.05 moles per liter of the Dequest 2060 inhibitor such a relationship is shown in FIG. 1 of the drawing. If a solution has a composition which falls outside the shaded region and is then moved into it by a pH-changing reaction, precipitation will occur. The arrow depicts the pH course of an actual test, at 100° F., using methyl formate to provide a pH changing reaction which lowers the pH from 9.0 to 5.8 in 16 hours.

Comparative core tests were performed to evaluate the produced concentrations of (a) an inhibitor squeezed-in and precipitated in place, in accordance with the present process and (b) an inhibitor merely squeezed-in, in accordance with prior procedures. Since the ion exchange capacity of Berea sandstone is higher than that of many carbonates, these tests were not good models of such operations in carbonate reservoirs. There is apt to be significantly less difference in the results obtained from the tests in sandstones than there would be in carbonates, since more of the inhibitor would be precipitated by natural processes in the sandstone than in the carbonate.

A description of the core tests is contained in Table V. In both tests the cores were first saturated with brines of the composition of that from well No. 2 in Table II and the inhibitor systems were injected, allowed to stand overnight, then backflowed by displacing them with brine of the same composition. Both tests were connected at a temperature of 100° F.

TABLE V

| | Description of Core Tests | | |
|---|---|---|---|
| Experiment | Core Description | Brine for Saturation | Inhibitor Solution | Remarks |
| 1 | Berea Sandstone 5.5 × 60 cm $k_w$ = 170 md, $\phi$ = 0.17 $V_p$ = 269 cm$^3$ | Well 2 | 0.05M DQ2060 1 M Glycine 0.47 M Methyl formate | ½ Vp, 135 ml, inhibitor injected. Core shut-in overnight and backflowed with brine, Well #25 |
| 2 | Berea Sandstone 5 × 5 × 60 cm $k_w$ = 169 md, $\phi$ = 0.17 $V_p$ = 263 cm | Well 2 | .05M DQ2060 | ½ Vp inhibitor injected. Core shut-in overnight and backflowed with brine, Well #25 |

In experiment No. 1, one-half pore volume of an inhibitor system of the present invention was injected and shut in overnight (although the hydrolysis of the methyl formate should have been substantially complete within about 2 hours). In the backflowing of the core, the initial production rate was 10 ml per hour but, half-way through the experiment, this rate was increased to 160 ml per hour. Experiment No. 2 was performed in the same way except that the inhibitor system was merely 0.05 moles per liter of Dequest 2060 inhibitor in the Well No. 2 brine with no attempt being made to artificially precipitate any calcium Dequest.

Figure 2:
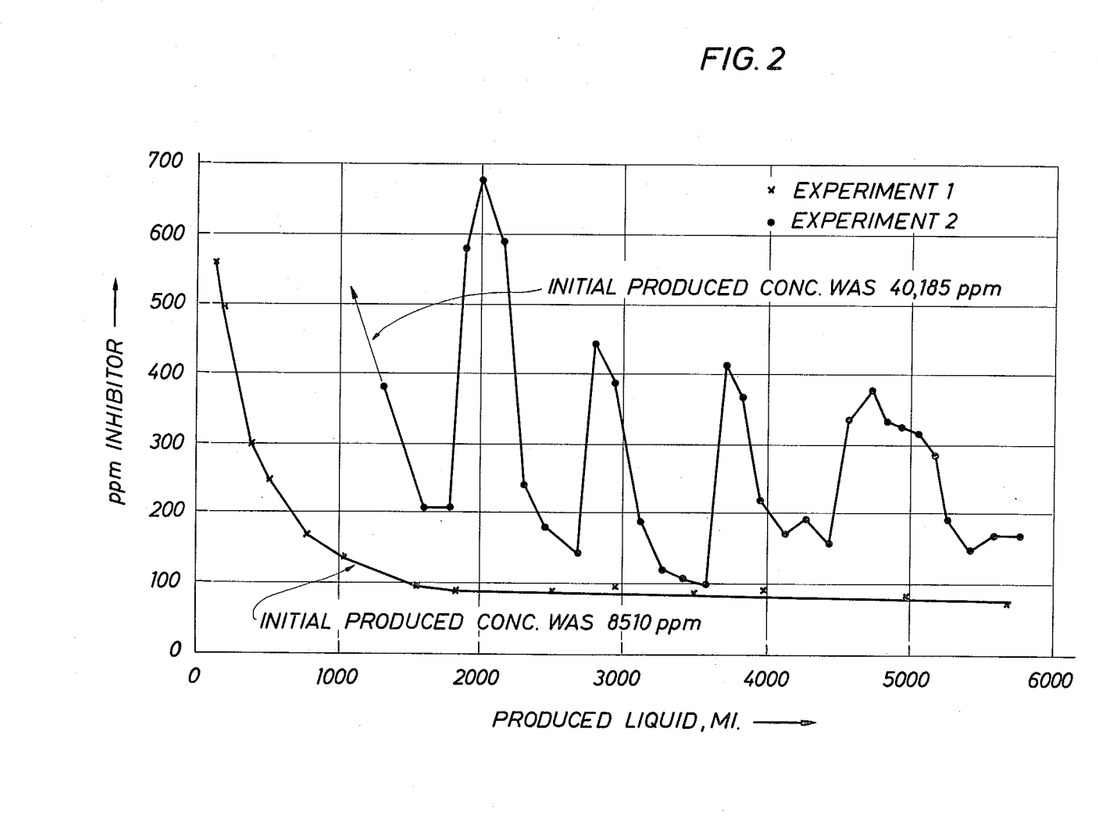
FIG. 2 shows a plot of the concentrations at which various scale inhibitors are produced from a rock formation by the flow of various amounts of an aqueous liquid through that formation.

FIG. 2 shows the results of those experiments. In experiment No. 1, in accordance with the present process, the concentration of produced inhibitor very quickly declined to about 100 parts per million and remained there for the duration of the experiment (during which 6 liters or 22 pore volumes of liquid was produced). During experiment No. 1 the amount of inhibitor produced was only 30% of the total amount of the inhibitor that was injected.

During experiment No. 2, in accordance with prior art procedures, the production of the inhibitor was erratic with alternately high and low levels of the inhibitor being present in the produced liquid. By the end of the experiment the material balance showed that 99% of the injected inhibitor was produced.

It is apparent that the present type of self-induced precipitation of an inhibitor within a reservoir formation can serve to maintain relatively low levels of the inhibitor in the produced water for relatively long periods of time. Well treating service companies and users of phosphonate scale inhibitors such as the Dequest inhibitors believe that about 25 parts per million of the phosphonate is adequate. The concentrations observed in experiment No. 1 were significantly greater than 25 parts per million but, at least in some instances, such a relatively high solubility of the multivalent salts of the inhibitor may prove to be desirable. In an actual field operation not all zones in the reservoir will accept equal amounts of the squeezed in inhibitor solution. The higher permeability in the watered out zones will cause them to take the bulk of such a solution. Therefore, when the well is produced, the inhibitor returns may be diluted within the wellbore and since not every well in a field will be squeezed, the inhibitor concentrations will be diluted at satellite stations and field treaters and problems may be avoided by a high concentration of inhibitor.

SODIUM BICARBONATE-CONTAINING SYSTEMS

Figure 3:
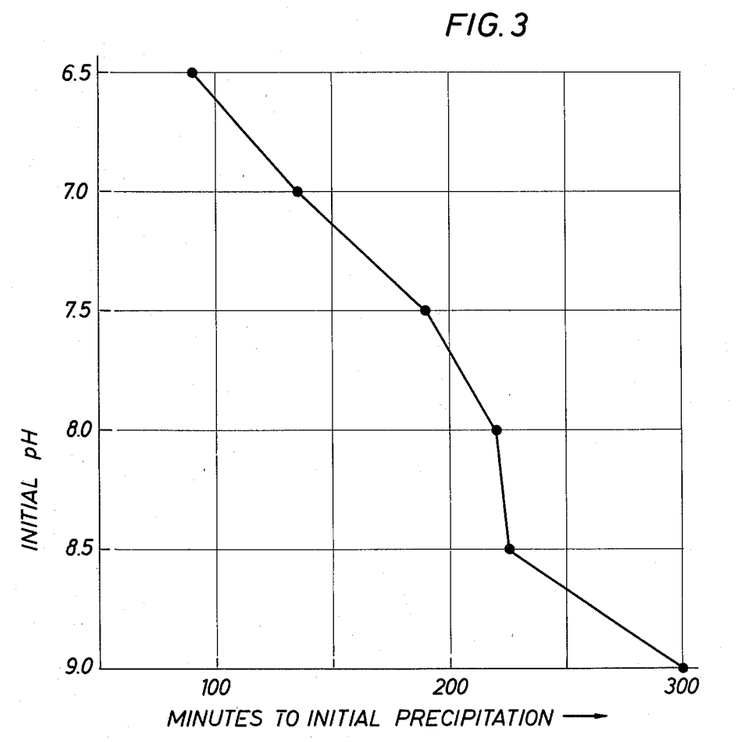
FIG. 3 shows the variations with initial solution pH in the times at which precipitates will form within the present solution.

The following tests have been conducted, or planned, regarding a particularly preferred inhibitor solution formulation consisting essentially of a water solution containing (in % by weight):

1.66% calcium chloride
5.73% Dequest 2060 inhibitor
0.84% sodium bicarbonate
1.86% methyl formate FIG. 3 shows the effects of the initial solution pH on the length of time required for the beginning of precipitation when the solution is maintained at 105° F. About 3 cc samples of a solution of the above formulation were mixed with enough acid or base to adjust the solution pH to each of the values indicated on the figure. The solutions in small test tubes were kept in a water bath at 105° F. until the beginning of precipitation could be seen. For example, in a solution having an initial pH of 7.5 the initial precipitation began at 190 minutes.

Figure 4:
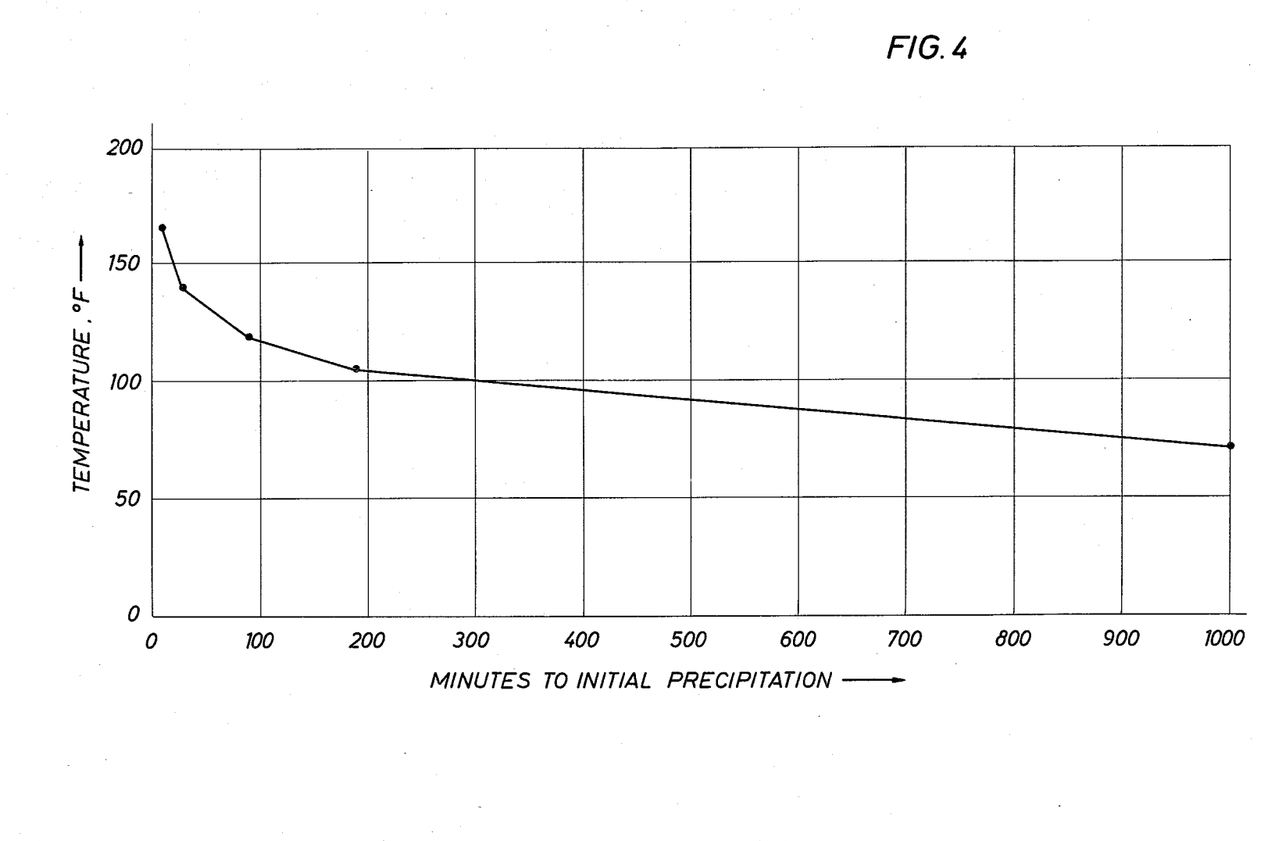
FIG. 4 shows such variations with temperature.

FIG. 4 shows the effect of temperature on the time required for the beginning of precipitation when a solution of the above formulation with an initial pH of 7.5 is maintained at the indicated temperature. For example, when such a solution was maintained at 105° F. the precipitation was initiated at 195 minutes; i.e., a time in substantial agreement with the tests shown in FIG. 3.

Figure 5:
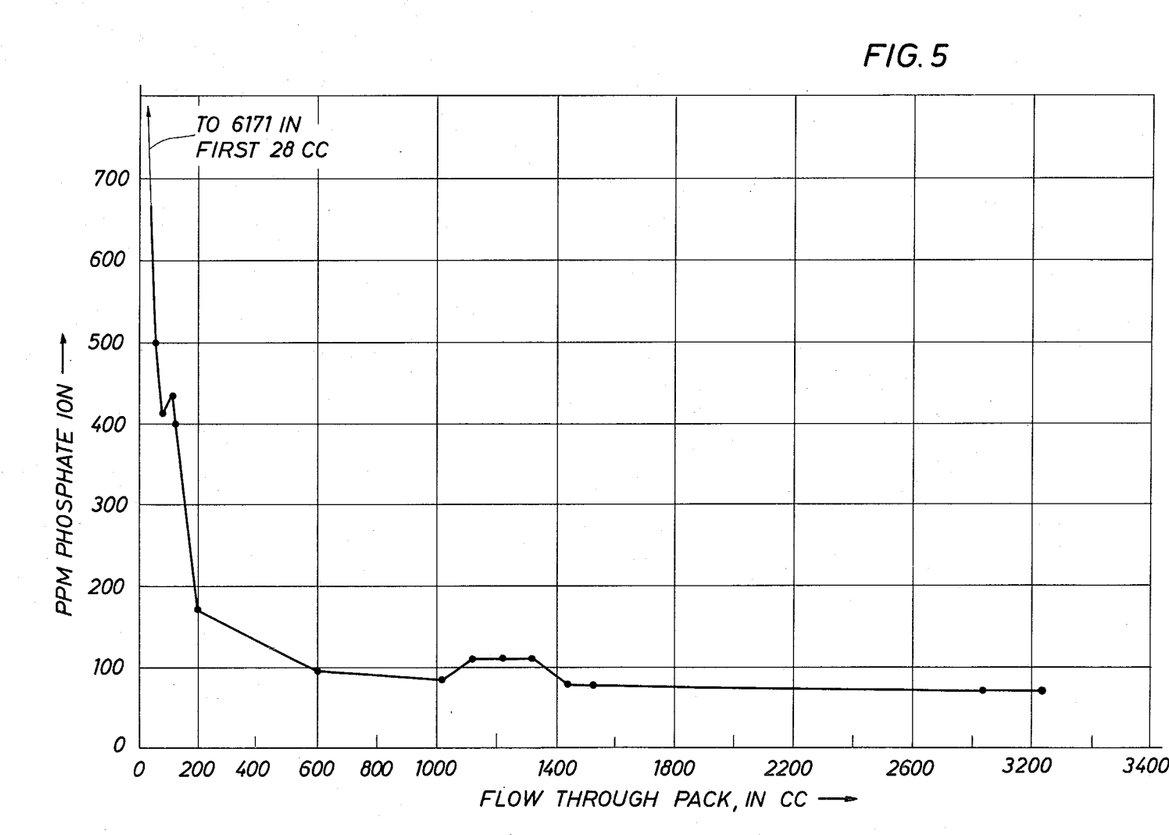
FIG. 5 shows the variations with amount of fluid outflow of the concentration of a scale inhibitor which was deposited, by the present process, within a sand pack through which fluid is flowed.

FIG. 5 shows the results of a test of flowing a solution of the above composition with the pH adjusted to an initial value of 7.5 into a sand pack of typical Wassen field core material which was initially permeated with an aqueous solution having a salinity equivalent to that of a typical reservoir water. The sand pack had a pore volume of about 75 cc. and enough of the inhibitor solution was flowed into the sand pack to displace the synthetic water and permeate the pack. The so-injected solution was allowed to stand overnight. The synthetic reservoir water was then injected into the pack at a rate substantially equivalent to that encountered during the production of such a well while the outflowing fluid was monitored with respect to its concentration of inhibitor. A standard color-metric test for phosphate ions was used to determine the inhibitor concentration.

As indicated on the figure, the phosphate ion concentration in the first 28 ccs of outflow was 6,171 parts per million. Such measurements were continued on samples of the volumes indicated between the points on the figure. After a rapid decline during the first 200 ccs of outflow, the rate of decline of the inhibitor concentration slowly decreased to about 70 parts per million during the outflowing of 3,200 ccs, or more than about 44 pore volumes of fluid.

FIELD TEST EXEMPLIFICATION

In a well opening into a reservoir at about 4000-foot depth and having an injectivity receptive to 2 to 3 barrels per minute of aqueous liquid the present process can advantageously be applied in the following manner. About 100 to 110 barrels of inhibitor solution of the above composition with its pH adjusted to about 7.5 are injected and displaced ahead of an aqueous liquid compatible with the reservoir water, to ensure a displacement of about 100 barrels of the solution into the reservoir. The well is then shutin overnight and is subsequently returned to fluid production.

It should be noted that the initial pH of a buffer-containing inhibitor solution can be adjusted by initially overriding the effects of the buffering agent by adding a relatively small amount of a strong acid or base such as hydrochloric acid or sodium hydroxide. Where a strong base is added, the initial pH is raised and is not lowered to the value at which it tends to be stabilized by the action of the buffer until that is effected by the relatively slow generation of hydrogen ions by an acid-yielding reactive component of the solution (such as methyl formate). This enables the operator to make only a minor adjustment in the composition of the inhibitor solution in order to correlate the rate of pH reduction with the temperature and injectivity properties of the well by delaying the initial precipitation time for longer than it would have been delayed in a solution of that composition except for the added strong base.

We claim:

1. A process for emplacing a scale inhibitor within a subterranean reservoir comprising:

dissolving at least one component each of (1) an anionic scale inhibitor that is a nitrogen-containing phosphonate which is (a) capable of preventing scaling by fluid produced from the reservoir at the reservoir temperature when present in the aqueous phase of the produced fluid in a relatively low but effective concentration, and (b) forms multivalent cation salts of multivalent cations which salts have a water solubility that is significantly less at a pH below about 10 than at a pH of from about 10 to 14, (2) a multivalent cation salt and (3) an alkaline compound in an aqueous liquid to provide a scale inhibitor solution containing scale inhibiting anions and multivalent cations which are mutually soluble at a relatively high pH but which, at a lower pH and the reservoir temperature, are precipitated as a scale inhibiting compound of relatively low water solubility;

also dissolving within the scale inhibitor solution at least one water-soluble ester or amide of a water-soluble acid which hydrolyzes at a relatively slow rate to reduce the pH of the solution;

wherein the rate at which the pH of the inhibitor solution is reduced, is controlled by selection of the particular pH reducing agent and scale inhibiting agent or the concentration of said pH reducing agent or scale inhibiting agent and/or by further dissolving in said scale inhibiting solution a buffering system;

said rate of the pH reduction -being correlated- with the temperature and injectivity properties of the well and reservoir so that (a) a selected volume of the inhibitor-containing solution can be injected into the reservoir before the occurrence of any significant amount of precipitation and (b) a significant amount of precipitation will occur within a few hours after that injection; and, injecting the inhibitor solution into the reservoir before the occurrence of a significant amount of precipitation at a rate such that a significant amount of said scale inhibiting compound of relatively low water solubility is precipitated near the borehole of the well.

2. The process of claim 1 in which the scale inhibitor solution contains a buffering system for maintaining the relatively high pH at which said scale inhibiting anions and multivalent cations are mutually soluble until the solution has flowed into the reservoir being treated.

3. The process of claim 1 in which scale inhibitor solution consist essentially of calcium chloride, diethylenetriaminepenta(methylenephosphonic acid), sodium bicarbonate -or glycine- and methyl formate.

4. The process of claim 3 in which glycine is used.

* * * * *